United States Patent [19]
Reiterman

[11] Patent Number: 5,556,239
[45] Date of Patent: Sep. 17, 1996

[54] POSITIVE CUTTING INSERT WITH COMPOUND CLEARANCE FACES

[75] Inventor: Lee Reiterman, Royal Oak, Mich.

[73] Assignee: Valenite Inc., Madison Heights, Mich.

[21] Appl. No.: 548,166

[22] Filed: Oct. 24, 1995

Related U.S. Application Data

[63] Continuation of Ser. No. 139,354, Oct. 18, 1993, abandoned.

[51] Int. Cl.$^6$ ................................................. B23C 5/02
[52] U.S. Cl. ................................................. 407/113
[58] Field of Search ................................. 407/113–116

[56] References Cited

U.S. PATENT DOCUMENTS

| | | |
|---|---|---|
| 4,411,564 | 10/1983 | Johnson . |
| 4,585,375 | 4/1986 | Erkfritz . |
| 4,693,641 | 9/1987 | Tsujimura et al. . |
| 4,699,549 | 10/1987 | Shimomura et al. . |
| 5,052,863 | 10/1991 | Satran ........................... 407/113 |
| 5,071,291 | 12/1991 | Kaminski ....................... 407/30 |
| 5,078,550 | 1/1992 | Satran et al. ................... 407/34 |
| 5,145,294 | 9/1992 | Flueckiger ..................... 407/42 |

Primary Examiner—M. Rachuba
Assistant Examiner—Kenneth S. Hansen
Attorney, Agent, or Firm—John W. Gregg; Mary K. Cameron

[57] ABSTRACT

An polygonal indexable insert for use in periphery milling cutters. The insert is a positive insert having compound clearance faces comprised of a curve primary clearance surface adjacent the cutting edge and a planar secondary clearance surface adjacent the clearance edge of the insert. The curved primary clearance surface imparts improved strength to the cutting edge of the insert.

3 Claims, 2 Drawing Sheets

POSITIVE CUTTING INSERT WITH COMPOUND CLEARANCE FACES

This is a continuation of U.S. patent application Ser. No. 08/139,354, filed Oct. 18, 1993, now abandoned.

BACKGROUND OF THE INVENTION

1. Field of the Invention

The present invention relates to a cutting insert with compound clearance faces for use in milling operations. The first clearance face proximal to the cutting edge is radiused and the second clearance face is planar.

The present invention further relates to cutting inserts which are pressed into final shape.

The present invention further relates to a cutting insert which achieves cutting face geometries and clearance faces which were formerly available only with ground type cutting tools.

The present invention further relates to a metal cutting insert having improved cutting edge strength.

2. Description of the Related Art

Kaminski, U.S. Pat. No. 5,071,291 discloses an internal disk milling cutter with an improved cutting insert. The cutting insert has a general wedge shape with an upper surface that is ground or otherwise formed so as to be concave thereby creating a pair of coplanar cutting edges that sweep back symmetrically from a forward most cutting corner or point. In particular, the upper surface of the insert is comprised of a pair of flat, triangular top faces that slope downward at a shallow angle to the center of the insert. The pair of cutting edges thereby formed are generally V-shaped and coplanar.

There is no showing of the compound clearance faces present in the instant application. Accordingly, the present application differs from Kaminski '291.

Satran et al., U.S. Pat. No. 5,078,550 discloses a cutting insert for use in rotary milling cutters. The insert has a side relief flank and a side base edge defined between the side relief flank and a base surface. The side relief flank comprises a first and second component side relief flank surface which meet at an intersection line. The first component side relief flank extend along the side relief flank from a first position adjacent a leading end of the insert and located at an intermediate position thereof to a second position intersecting the cutting edge and adjacent a trailing end of the insert.

The component flank surfaces are substantially planar and are angularly disposed with respect to one another so that an insert side relief angle defined with respect to the cylindrical holder in the region of the leading end substantially equals an insert side relief angle in the region of the trailing end.

Satran '550 differs from the present invention because the component relief flank surfaces of Satran '550 are planar, whereas the component relief flank surfaces of the present invention are comprised of a convexly curved first relief flank surface, as seen in a side sectional view, and a planar secondary relief flank surface. It has been determined that a radiused primary clearance adjacent the cutting edge imparts improve strength to the cutting edge. Accordingly, the present invention differs from Satran '550.

SUMMARY OF THE INVENTION

The present invention is a cutting insert having compound clearance faces and which is formable without the need for expensive grinding operations. The insert a polygonal indexable cutting insert having improved edge strength. The insert is comprised of a top surface, a planar bottom surface which is smaller than the top surface, and a side wall extending outwardly at an obtuse angle from the bottom surface and intersects the top surface to define the body of the insert. The intersection of the side wall and the top surface defines a cutting edge. The side wall is comprised of side flank portions which are defined as that portion of the side wall which extends from one corner of the insert to the adjacent corner of the insert. Each side flank is comprised of a primary clearance surface and a secondary clearance surface. The primary clearance surface is convexly radiused, as seen in a side sectional view, and extends from the cutting edge to a distance on the flank intermediate the top and bottom surface. The secondary clearance surface is planar and extends along the flank from the bottom surface to intersect with the primary clearance surface at the previously described distance intermediate the top and bottom surface. The intersection of the secondary clearance surface and the bottom surface forms the clearance edge of the insert.

The top surface of the insert may be flat or have a curved clearance face, or may be provided with a variety of different top forms, which include different geometries and chipbreakers as are within the scope of those of ordinary skill in the art.

DETAILED DESCRIPTION OF THE PREFERRED EMBODIMENT

Figure 1:
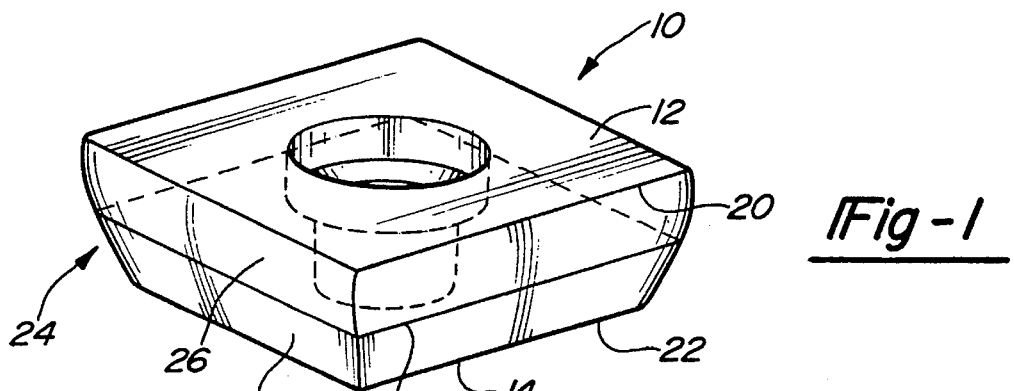
FIG. 1 is a top perspective view of the polygonal insert.

Turning now to the drawings wherein like numbers depict like structures, insert 10 is comprised of a top surface 12, a planar bottom surface 14, which is smaller than the top surface, and a sidewall 16 extending outwardly from the bottom surface at an obtuse angle and intersects the top surface to define a body 18 of the insert. The orientation of the side wall to the top and bottom surface provides the insert with a positive clearance orientation.

Figure 2:
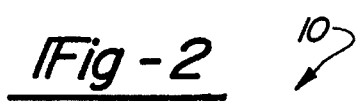
FIG. 2 is a top plan view of the polygonal insert.
Figure 3:
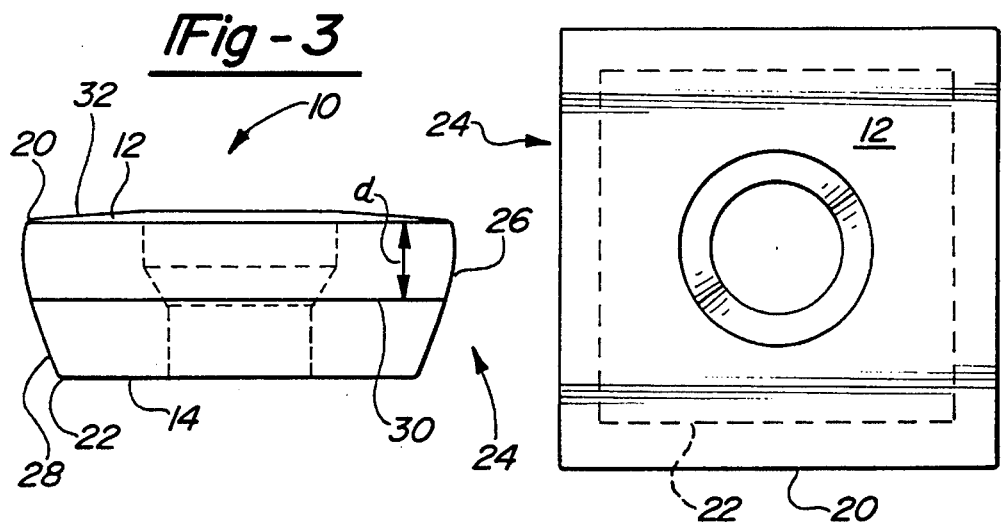
FIG. 3 is an end plan view of the insert showing the compound clearance surfaces.
Figure 4:
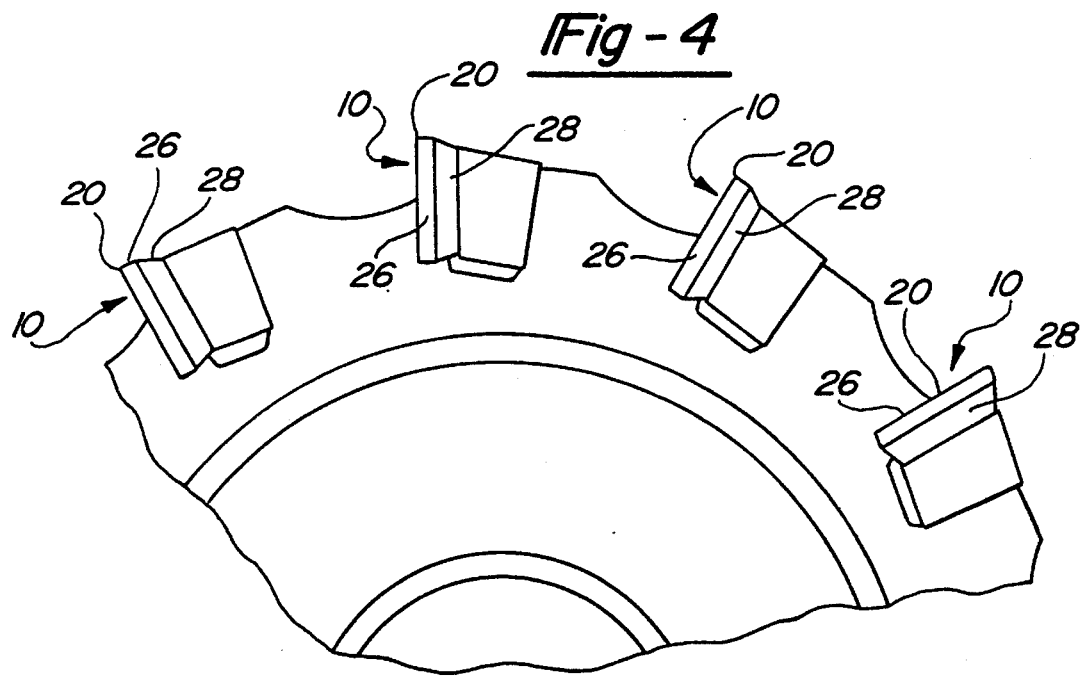
FIG. 4 is a detailed view of the insert in a tool holder.
Figure 5A:
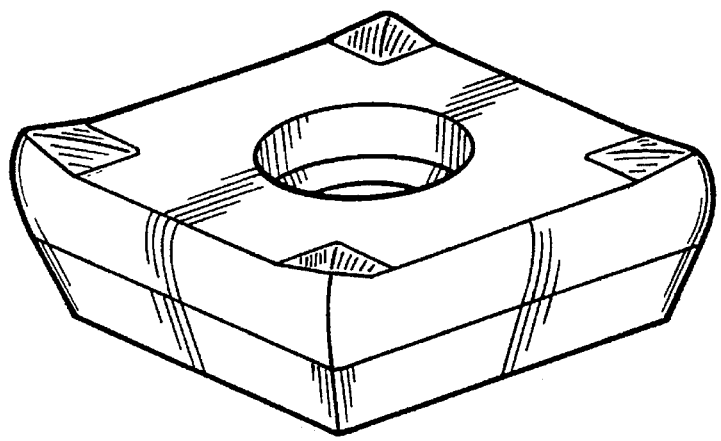
FIGS. 5a, 5b, and 5c show top perspective views of various forms of the insert top face.
Figure 5B:
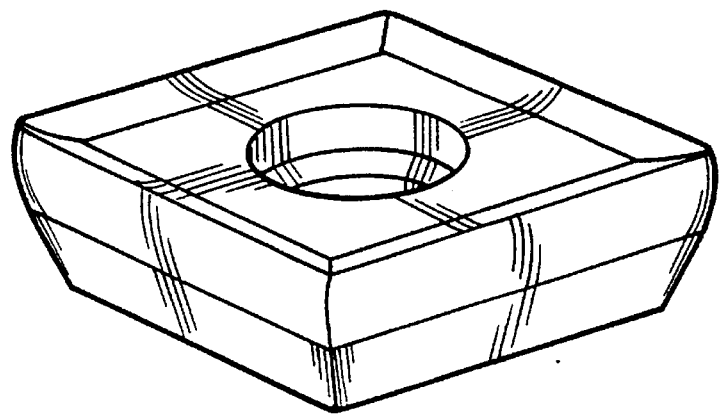
Figure 5C:
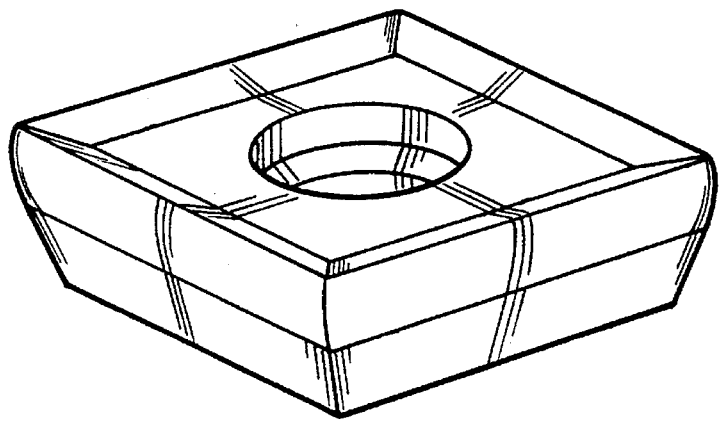

The intersection of the side wall with the top surface defines cutting edge 20 which, as can be seen in the FIG. 2, is straight. The intersection with the bottom surface defines clearance edge 22, which, as can be seen in the drawings, is also a straight line.

The sidewall is comprised of side flank portions 24. Each side flank portion is composed of a primary clearance surface 26, which is adjacent to the cutting edge, and a secondary clearance surface 28, which is adjacent the clearance edge. The primary clearance surface, as seen in a side sectional view, is convexly curved. The curved primary clearance surface imparts improved strength to the cutting edge, and further provides for extra clearance along the flank of the insert. The secondary clearance surface is planar and intersects the primary clearance surface at some distance d, along a junction line 30, which is intermediate the top and bottom surface.

The top surface may be provided with a variety of top forms, and chipbreakers, depending upon the material to be cut and the use to which the insert would be put. For example, the insert could be equipped with a convexly curved top surface 32, or any other top form desired by the designer.

The insert is designed for use in a peripheral rotary milling cutter having replaceable inserts.

Those skilled in the art will recognize that many variation are possible without departing from the scope and spirit of the invention.

We claim:

1. A polygonal, indexable insert for peripheral rotary cutters comprising:

a top surface, a planar bottom surface smaller than said top surface, and a side wall intersecting said bottom surface to define a clearance edge and extending outward from said bottom surface at an obtuse angle and intersecting said top surface to define a body; said intersection of said side wall and said top surface defining a cutting edge; said side wall comprised of side flank portions which extend from one corner of the insert to an adjacent corner of the insert; each side flank portion comprised of a primary clearance surface positioned adjacent to the cutting edge and a secondary clearance surface positioned adjacent to the bottom surface; said primary clearance surface being convexly curved in a direction from said cutting edge to a junction line some distance along said sidewall intermediate said top and bottom surface such that the primary clearance surface is curved in a direction transverse to a length of the cutting edge; said secondary clearance surface being planar and extending along said sidewall from said clearance edge to said junction line.

2. The insert of claim 1, wherein the top surface is convexly curved.

3. The insert of claim 1, wherein the junction line is substantially parallel to the cutting edge.

* * * * *